(12) United States Patent
Egawa (10) Patent No.: US 8,730,346 B2
(45) Date of Patent: May 20, 2014

(54) SOLID-STATE IMAGING APPARATUS

(75) Inventor: Yoshitaka Egawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 56 days.

(21) Appl. No.: 13/238,365

(22) Filed: Sep. 21, 2011

(65) Prior Publication Data

US 2012/0120286 A1 May 17, 2012

(30) Foreign Application Priority Data

Nov. 17, 2010 (JP) ................................. 2010-257014

(51) Int. Cl.
*H04N 9/73* (2006.01)
*H04N 5/235* (2006.01)

(52) U.S. Cl.
USPC ..................... 348/226.1; 348/229.1

(58) Field of Classification Search
USPC ........... 348/226.1, 246, 294, 222.1, 447, 247, 348/302, 289, 285, 281, 28, 229.1
See application file for complete search history.

(56) References Cited

U.S. PATENT DOCUMENTS

| | | | |
|---|---|---|---|
| 6,507,365 B1 * | 1/2003 | Nakamura et al. | 348/296 |
| 7,209,169 B2 * | 4/2007 | Matsumoto et al. | 348/302 |
| 7,869,652 B2 * | 1/2011 | Asano et al. | 382/168 |
| 2002/0154225 A1 * | 10/2002 | Matsumoto et al. | 348/229.1 |
| 2007/0110332 A1 * | 5/2007 | Asano et al. | 382/275 |
| 2009/0167894 A1 * | 7/2009 | Nakaoka et al. | 348/226.1 |
| 2011/0096193 A1 | 4/2011 | Egawa | |

FOREIGN PATENT DOCUMENTS

| | | |
|---|---|---|
| JP | 2001-016508 | 1/2001 |
| JP | 2003-319204 | 11/2003 |
| JP | 2004-048616 | 2/2004 |
| JP | 2004-222228 | 8/2004 |
| JP | 2006-245784 | 9/2006 |
| JP | 2010-098416 | 4/2010 |

OTHER PUBLICATIONS

Office Action issued Sep. 10, 2013, in Japanese Patent Application No. 2010-257014, filed Nov. 17, 2010 (with English-language Translation).

\* cited by examiner

*Primary Examiner* — Ahmed A Berhan (74) *Attorney, Agent, or Firm* — Oblon, Spivak, McClelland, Maier & Neustadt, L.L.P.

(57) ABSTRACT

According to one embodiment, a solid-state imaging apparatus includes: a pixel unit in which pixels are arranged in a matrix form; an electronic shutter scanning circuit controlling an accumulation time of the pixels for each line of the pixel unit; a flicker correction circuit correcting flicker generated in a signal imaged in the pixel unit for each line based on a signal of the pixels of each of the lines in which the accumulation times are different from each other.

20 Claims, 9 Drawing Sheets

SOLID-STATE IMAGING APPARATUS

CROSS-REFERENCE TO RELATED APPLICATIONS

This application is based upon and claims the benefit of priority from the prior Japanese Patent Application No. 2010-257014, filed on Nov. 17, 2010; the entire contents of which are incorporated herein by reference.

FIELD

Embodiments described herein relate generally to a solid-state imaging apparatus.

BACKGROUND

In CMOS solid-state imaging apparatuses, lateral-striped flicker of light and dark regions is generated in fluorescent light. In order to eliminate the flicker, a gain of a signal level is adjusted for each line through signal processing. However, such a countermeasure to the flicker may not be effective for moving images, whereas being effective for still images. Therefore, a countermeasure to the flicker which is effective for moving images is required.

DETAILED DESCRIPTION

In general, according to one embodiment, a solid-state imaging apparatus includes a pixel unit, an electronic shutter scanning circuit, and a flicker correction circuit. In the pixel unit, pixels are arranged in a matrix form. The electronic shutter scanning circuit controls an accumulation time of the pixels for each line of the pixel unit. The flicker correction circuit corrects flicker generated in a signal imaged in the pixel unit for each line based on a signal of the pixels of each of the lines in which the accumulation times are different from each other.

Exemplary embodiments of the solid-state imaging apparatus will be explained below in detail with reference to the accompanying drawings. The present invention is not limited to the following embodiments.

Figure 1:
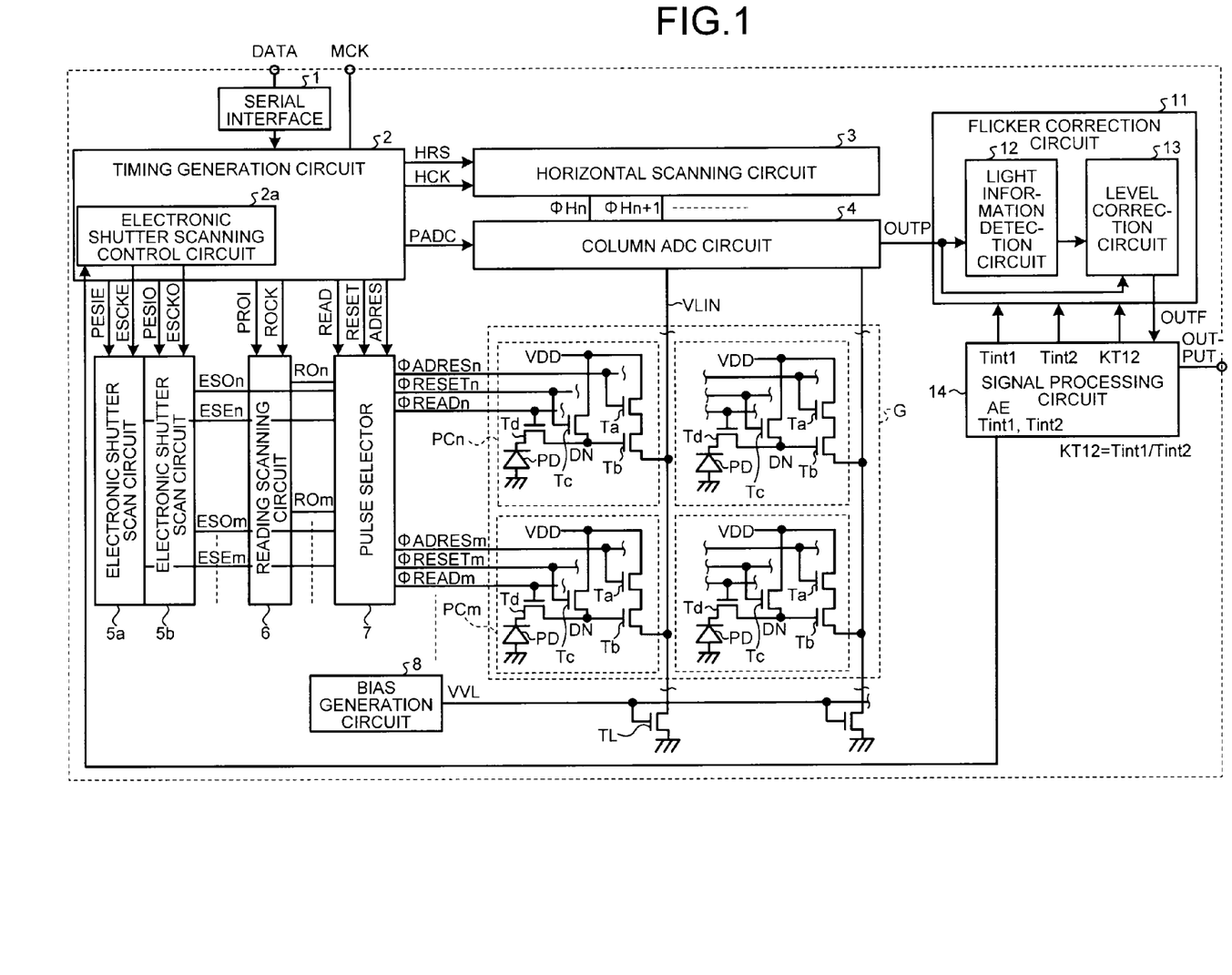
FIG. 1 is a block diagram of the overall configuration of a solid-state imaging apparatus according to an embodiment.

FIG. 1 is a block diagram illustrating the overall configuration of the solid-state imaging apparatus according to an embodiment.

In FIG. 1, in a pixel unit G of a solid-state imaging apparatus, pixels that accumulate photoelectrically converted charges are arranged in a matrix form. Each pixel includes cells PCn and PCm. The cells PCn and PCm each include a photodiode PD, a row selection transistor Ta, an amplification transistor Tb, a reset transistor Tc, and a read transistor Td.

In the cell PCn, the source of the read transistor Td is connected to the photodiode PD and a read signal ΦREADn is input to the gate of the read transistor Td. The source of the reset transistor Tc is connected to the drain of the read transistor Td, a reset signal ΦRESETn is input to the gate of the reset transistor Tc, and the drain of the reset transistor Tc is connected to a power supply potential VDD. A row selection signal ΦADRESn is input to the gate of the row selection transistor Ta and the drain of the selection transistor Ta is connected to the power supply VDD. The source of the amplification transistor Tb is connected to a vertical signal line VLIN, the gate of the amplification transistor Tb is connected to the drain of the read transistor Td, and the drain of the amplification transistor Tb is connected to the source of the row selection transistor Ta.

Here, a detection node DN is formed at a connection point of the gate of the amplification transistor Tb and the drain of the read transistor Td. The detection node DN can be formed with a floating diffusion. The drain of a load transistor TL is connected to the vertical signal line VLIN and a bias signal VVL is input to the gate of the load transistor TL. The load transistor TL forms a source follower so as to perform a constant current operation.

In the cell PCm, a read signal ΦREADm is input to the gate of the read transistor Td, a reset signal ΦRESETm is input to the gate of the reset transistor Tc, and a row selection signal ΦADRESm is input to the gate of the row selection transistor Ta.

An imaging unit of the solid-state imaging apparatus includes a serial interface 1 that relays input data DATA; a timing generating circuit 2 that control a reading or accumulation timing of each pixel; a horizontal scanning circuit 3 that scans read pixels in a horizontal direction; a column ADC circuit 4 that performs a correlated double sampling (CDS) process, an AD conversion process, or the like on a reading signal; electronic shutter scan circuits 5a and 5b that perform electronic shutter scanning on each line; a reading scanning circuit 6 that scans the read pixels in a vertical direction; a pulse selector 7 that generates the reading signal ΦREADn, the reset signal ΦRESETn, and the row selection signal ΦADRESn; and a bias generation circuit 8 that generates the bias signal VVL. The electronic shutter scanning circuit 5a performs the electronic shutter scanning on each even-numbered line and the electronic shutter scanning circuit 5b performs the electronic shutter scanning on each odd-numbered line.

The timing generation circuit 2 includes an electronic shutter scanning control circuit 2a that controls a timing of electronic shutter scanning. The electronic shutter scanning circuits 5a and 5b and the reading scanning circuit 6 can be configured by a shift resister. The timing generation circuit 2 controls generation timings of accumulation start signals ESOn, ESOm, ESEn, and ESEm and reading start signals ROn and ROm so that predetermined lines are selected.

The solid-state imaging apparatus further includes a flicker correction circuit 11 and a signal processing circuit 14. The flicker correction circuit 11 includes a light information detection circuit 12 and a level correction circuit 13. The flicker correction circuit 11 can correct flicker (light and dark transverse bands on a reproduction screen of a monitor) generated in a signal OUTP imaged in the pixel unit G for each line based on the signal OUTP of the pixels in each of lines with a different accumulation time. The light information detection circuit 12 can detect light quantity change information from the signal OUTP of the pixels of a different line. The level correction circuit 13 can correct the signal OUTP of the pixels for each line based on the light quantity change information detected by the light information detection circuit 12. The signal processing circuit 14 can control an accumulation time Tint1 of an even-numbered line and an accumulation time Tint2 of an odd-numbered line for each frame based on a light quantity measurement value AE measured from a signal of the pixel unit G. As a method of measuring the light quantity measurement value AE and controlling the accumulation time, for example, one frame correction signals OUTF are averaged and the accumulation time is made to be shorter when the average value is greater than a reference set value. When the average value is less than the reference set value, the accumulation time is made to be longer.

A master clock MCK is input to the timing generation circuit 2, so that an imaging operating timing is controlled. A start pulse HRS and a horizontal clock HCK are output from the timing generation circuit 2 to the horizontal scanning circuit 3. A timing control signal PADC is output from the timing generation circuit 2 to the column ADC circuit 4 and column selection signals Φn, Φn+1, . . . are output from the horizontal scanning circuit 3 to the column ADC circuit 4.

Timing control signals PESIE and ESCKE are input from the electronic shutter scanning control circuit 2a to the electronic shutter scanning circuit 5a. Timing control signals PESIO and ESCKO are input from the electronic shutter scanning control circuit 2a to the electronic shutter scanning circuit 5b. The electronic shutter scanning circuits and 5a and 5b alternately output the accumulation start signals ESEn and ESEm for the even-numbered lines and the accumulation start signals ESOn and ESOm for the odd-numbered lines to the pulse selector 7.

The signal processing circuit 14 calculates the light quantity measurement value AE from the signal OUTF output from the level correction circuit 13 and sets the accumulation times Tint1 and Tint2 based on the light quantity measurement value AE. At this time, the accumulation times Tint1 and Tint2 are set to be different from each other. For example, when the light quantity measurement value AE becomes K times larger, the accumulation time Tint1 is set to become 1/K times larger. Further, the accumulation time Tint2 can be calculated to be A times (where 0<A<1) the accumulation time Tint1.

The reading scanning circuit 6 generates the reading start signals ROn and ROm in accordance with timing control signals PROI and ROCK output from the timing generation circuit 2 and outputs the reading start signals ROn and ROm to the pulse selector 7. The timing generation circuit 2 generates timing control signals READ, RESET, and ADRES for controlling the reading, reset, and row selection timings and outputs the timing control signals READ, RESET, and ADRES to the pulse selector 7.

The pulse selector 7 generates the reading signals ΦREADn and ΦREADm, the reset signals ΦRESETn and ΦRESETm, and the row selection signals ΦADRESn and ΦADRESm based on the timing control signals READ, RESET, and ADRES, the accumulation start signals ESOn, ESOm, ESEn, and ESEm, and the reading start signals ROn and ROm and sequentially outputs the reading signals ΦREADn and ΦREADm, the reset signals ΦRESETn and ΦRESETm, and the row selection signals ΦADRESn and ΦADRESm to the cells PCn and PCm.

When the row selection signal ΦADRESn is in an off-state, the row selection transistor Ta becomes an off-state and the source follower does not operate, thereby outputting no signal. At this time, when the reading signal ΦREADn is output to the cell PCn, the reading transistor Td of the cell PCn is turned on and signal charges accumulated in the photodiode PD are transmitted to the detection node DN. Hereupon, the photodiode PD starts accumulating (Tint) effective signal charges. The signal charges are read to the detection node DN. Thereafter, when the reset signal ΦRESETn is output to the cell PCn, the reset transistor Tc is turned on and the signal charges read to the detection node DN are discharged.

Next, when the row selection signal ΦADRESn in an on-state is output to the cell PCn, the row selection transistor Ta of the cell PCn is turned on. Then, the signal can be output since the amplification transistor Tb and the load transistor TL of the cell PCn are configured as the source follower. When the ΦRESETn is output to the cell PCn, the reset transistor Tc is turned on and the charges accumulated in the detection node DN are thus reset. At this time, the reset voltage of the detection node DN is output to the source follower circuit and the reset voltage is maintained in the column ADC circuit 4. Next, when the reading signal ΦREADn in the on-state is output to the cell PCn in the state where the row selection transistor Ta of the cell PCn is turned on, the reading transistor Td is turned on and the signal charge amount accumulated in the photodiode PD is read to the detection node DN. A signal voltage (reset voltage+signal voltage) converted in the detection node DN is output to the column ADC circuit 4 through the source follower circuit. Then, the reset voltage is eliminated by the column ADC circuit 4.

Next, the column ADC circuit 4 performs AD conversion on the read signal voltage during one horizontal period and retains digital data in a line memory. Then, one-line data are sequentially read from the line memory during the subsequent one horizontal period.

Further, when the read signal ΦREADm is output to the cell PCm in a state where the row selection transistor Ta is turned off, the reading transistor Td of the cell PCm is turned on and the charges accumulated in the photodiode PD is accumulated in the detection node DN. Then, when the charges accumulated in the photodiode PD of the cell PCm are accumulated in the detection node DN and the reset signal ΦRESETm is then output to the cell PCm, the reset transistor Tc is turned on and the charges accumulated in the detection node DN are thus discharged.

Next, when the row selection signal ΦADRESm is output to the cell PCm, the row selection transistor Ta of the cell PCm is turned on. When the reading signal ΦREADm is output to the cell PCm in a state where the row selection transistor Ta of the cell PCm is turned on, the reading transistor Td is turned on and the voltage corresponding to the amount of charges accumulated in the photodiode PD is applied to the gate of the amplification transistor Tb. Here, since the source follower is configured by the amplification transistor Tb and the load transistor TL of the cell PCm, the voltage applied to the gate of the amplification transistor Tb is followed by the voltage of the vertical signal line VLIN.

The column ADC circuit 4 simultaneously converts a voltage change of the vertical signal line VLIN into a digital signal by the ADC circuit and outputs the digital signal to in the line memory. Then, one-line data are sequentially read from the line memory during the subsequent horizontal period. The one frame data are read by repeatedly reading the one-line data while increasing the lines to be read one by one.

When the read data are detected in the column ADC circuit 4, the output signal OUTP corresponding to the detection result is output to the flicker correction circuit 11.

When the output signal OUTP is output to the flicker correction circuit 11, the light information detection circuit 12 detects the light quantity change information from the signals OUTP for the pixels of the odd-numbered line and the even-numbered line and outputs the detection result to the level correction circuit 13.

The level correction circuit 13 corrects the signal OUTP for the pixels of the pixel unit G for each line based on the light quantity change information and outputs a corrected signal OUTF. Here, when the signal OUTP for the pixels is corrected, the signal OUTP is corrected in every line to eliminate flicker generated in the signal OUTP. Further, the signal OUTP is also corrected to eliminate a difference between signal levels based on the accumulation times Tint1 and Tint2 set to be different in the even-numbered line and the odd-numbered line.

The high intensity and low intensity of a fluorescent flicker level is repeated at a constant period (50 Hz or 60 Hz). For this reason, the shorter the accumulation time of each line is, the larger the amplitude of the flicker level between the lines is. On the other hand, the longer the accumulation time of each line, the shorter the amplitude of the flicker level between the lines is.

As a consequence, the flicker level can be detected by comparing the signal OUTP for the pixels of the line in which the accumulation time is shorter with the signal OUTP for the pixels of the line in which the accumulation time is longer. In order to detect the flicker level, the accumulation times Tint1 and Tint2 may be set to any value when the accumulation times Tint1 and Tint2 are different from each other. It is not necessary to fix the accumulation times Tint1 and Tint2 between the frames. Accordingly, the flicker level can be detected while controlling the accumulation times Tint1 and Tint2 based on the light quantity measurement value AE, thereby following the accumulation times Tint1 and Tint2 to the change in the amount of light in successive imaging operations. Thus, it is possible to suppress the flicker for a moving image, while suppressing image quality deterioration caused due to the change in the amount of light.

In the embodiment of FIG. 1, the method has been explained such that the two electronic shutter scanning circuits 5a and 5b are provided so as to separately control the accumulation time Tint1 of the even-numbered line and the accumulation time Tint2 of the odd-numbered line. However, one electronic shutter scanning circuit may be provided so as to separately control the accumulation time Tint1 of the even-numbered line and the accumulation time Tint2 of the odd-numbered line.

The two electronic shutter scanning circuits 5a and 5b may be configured such that the electronic shutter scanning circuit 5a drives a first pair of two lines and the electronic shutter scanning circuit 5b drives a second pair of two lines on the assumption that every two vertical lines are set as a pair of lines.

In this embodiment, the shift resister circuit is used in the scanning circuit, but the scanning may be performed by a multiplexer circuit.

Figure 2:
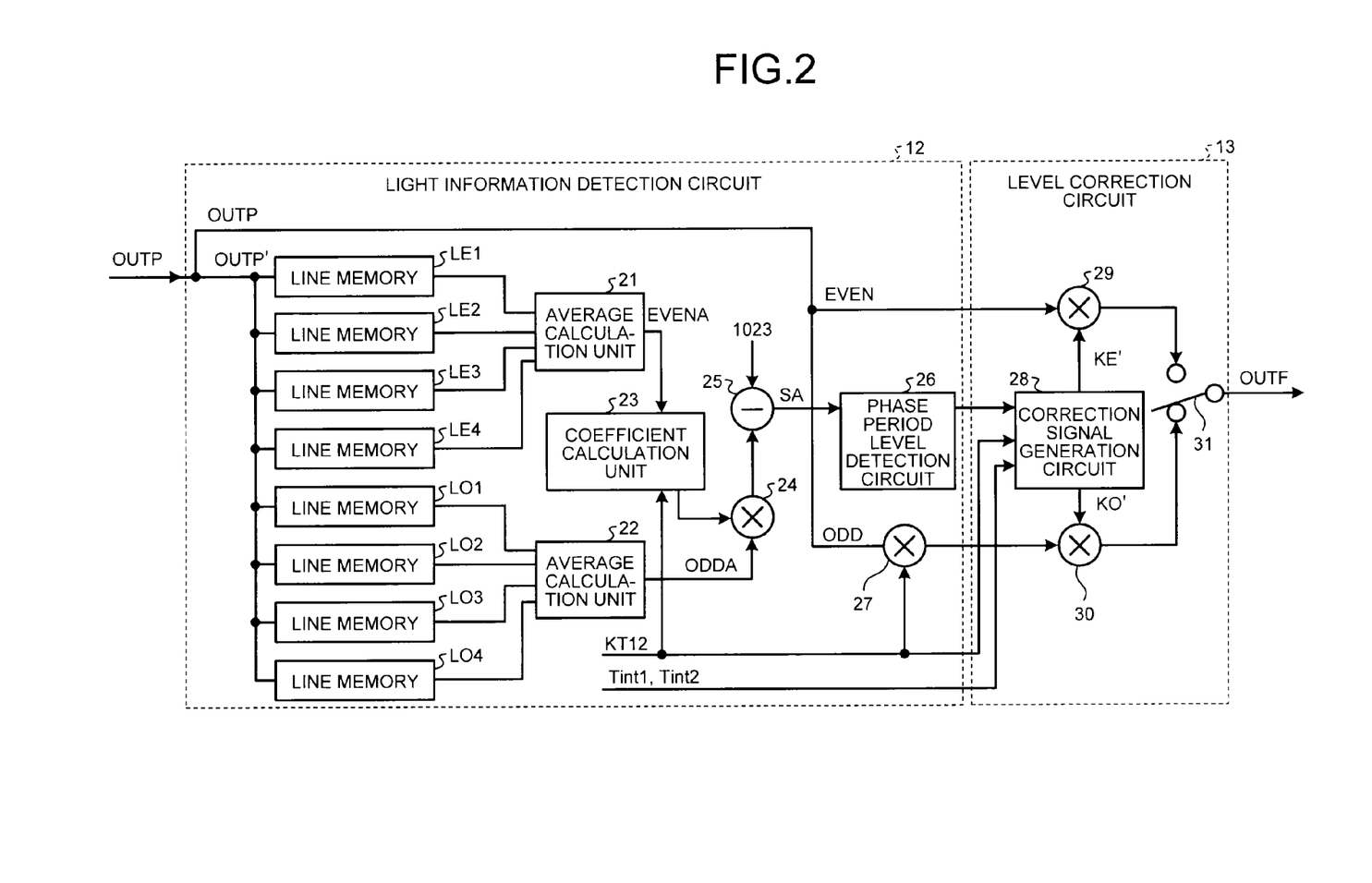
FIG. 2 is a block diagram of the overall configuration of a flicker correction circuit in FIG. 1.

FIG. 2 is a block diagram illustrating the schematic configuration of the flicker correction circuit in FIG. 1.

In FIG. 2, the light information detection circuit 12 includes line memories LE1 to LE4 and LO1 to LO4, average calculation units 21 and 22, a coefficient calculation unit 23, multipliers 24 and 27, a subtracter 25, and a phase period level detection circuit 26.

The level correction circuit 13 includes a correction signal generation circuit 28, multipliers 29 and 30, and a switch 31.

Output signals OUTP' from the pixels of the even-numbered lines of the current frame are stored in the line memories LE1 to LE4 and are output to the average calculation unit 21. Further, output signals OUTP' from the pixels of the odd-numbered lines of the current frame are stored in the line memories LO1 to LO4 and are output to the average calculation unit 22. The signals OUTP' are signals from the pixels of the current frame and the signals OUTP are signals from the pixels of the subsequent frame.

The average calculation unit 21 calculates an average value EVENA of the signals G of four even-numbered lines and outputs the average value EVENA to the coefficient calculation unit 23. The average calculation unit 22 calculates an average value ODDA of the signals G of four odd-numbered lines and outputs the average value ODDA to the multiplier 24. When the color filter array of color sensors is the Bayer array, only the signals G can be extracted and averaged.

The coefficient calculation unit 23 outputs, to the multiplier 24, a coefficient obtained by multiplying a coefficient, at which the average value EVENA becomes a saturated level, and a coefficient of an accumulation time ratio. For example, when an AD conversion width is 10 bits and the accumulation time ratio KT12 is equal to Tint1/Tint2, the coefficient calculation unit 23 calculates a coefficient of (1023/EVENA)*KT12. The value of 1023 is a saturated level when a data width is 10 bits. The value of the saturated level can be set depending on the data width.

When the multiplier 24 multiplies the average value ODDA by the coefficient calculated by the coefficient calculation unit 23 and the subtracter 25 subtracts the multiplied result of the multiplier 24 from 1023, a difference signal SA is generated and output to the phase period level detection circuit 26.

When no fluorescent flicker is generated, the difference signal SA=1023−((1023/EVENA)*KT12)*ODDA is substantially zero. When the fluorescent flicker is generated, the difference signal SA corresponding to the flicker level is generated.

That is, at a light signal level of the flicker, a signal obtained by multiplying the average value ODDA by the accumulation time ratio KT12 has substantially the same as that of the average value EVENA. On the other hand, at a dark signal level of the flicker, the signal obtained by multiplying the average value ODDA by the accumulation time ratio KT12 does not have substantially the same as that of the average value EVENA and the difference signal SA corresponding to the darkness of the flicker is generated. The fluorescent flicker level can be calculated depending on the value of the difference signal SA. Accordingly, when the difference signal SA is substantially zero, it can be determined that no flicker is generated.

The phase period level detection circuit 26 detects the phase, period, and level of the flicker based on the difference signal SA and outputs the detection result to the correction signal generation circuit 28.

The correction signal generation circuit 28 calculates a flicker correction coefficient KE' of the even-numbered line of the subsequent frame and a flicker correction efficient KO' of the odd-numbered line of the subsequent frame based on the detection result of the phase, period, and level of the flicker and outputs the flicker correction coefficient KE' and the flicker correction coefficient KO' to the multipliers 29 and 30, respectively.

The multiplier 27 multiplies the output signal ODD from the pixels of the odd-numbered line of the subsequent frame by the accumulation time ratio KT12, so that an output signal ODD from the pixels of the odd-numbered line of the subsequent frame and an output signal EVEN from the pixels of the even-numbered line of the subsequent frame are corrected so as to have the same signal level for the amount of light. The multiplier 27 outputs the output signals ODD and EVEN to the multiplier 30.

The multiplier 29 multiplies the output signal EVEN from the pixels of the even-numbered line of the subsequent frame by the flicker correction coefficient KE' and outputs the result to the switch 31. Further, the multiplier 30 multiplies the output signal ODD from the pixels of the odd-numbered line of the subsequent frame by the flicker correction coefficient KO' and outputs the result to the switch 31.

The switch 31 alternately switches the outputs from the multipliers 29 and 30 for every line to output a correction signal OUTF in which the fluorescent flicker is corrected.

Thus, even when the accumulation times Tint1 and Tint2 are set to any value, the flicker can be suppressed in a moving image since the flicker level can be corrected based on the difference between the signal OUTP of the pixels of the even-numbered line, in which the accumulation time Tint1 is longer, and the signal OUTP of the pixels of the odd-numbered line, in which the accumulation time Tint2 is shorter.

In the embodiment of FIG. 2, the method has been exemplified such that the output signals OUTP' of four lines of the current frame are averaged. Instead, the number of lines is not limited to four, but one or more lines may be used. Further, the signal for averaging the output signals OUTP' of the current frame is not limited to the signal G.

Figure 3:
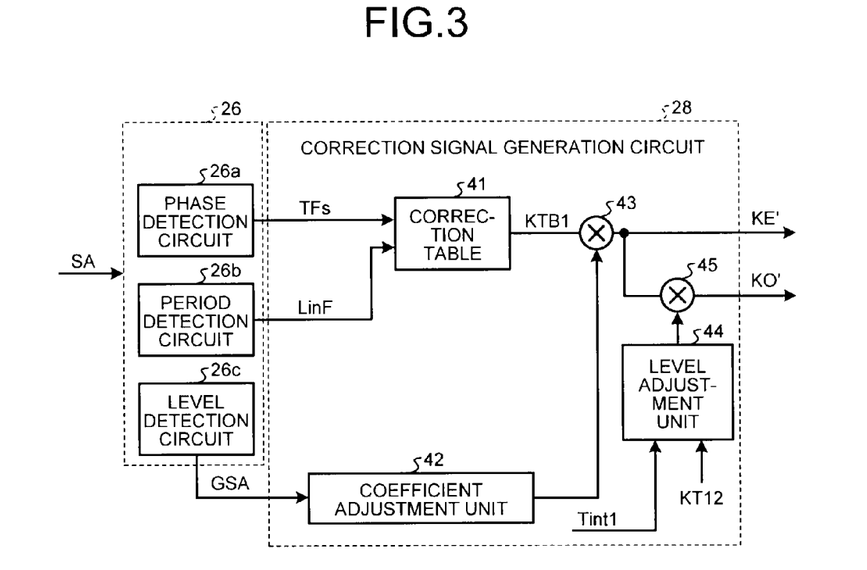
FIG. 3 is a block diagram of an example of a correction signal generation circuit in FIG. 2.

FIG. 3 is a block diagram illustrating an example of the correction signal generation circuit in FIG. 2.

In FIG. 3, the phase period level detection circuit 26 includes a phase detection circuit 26a which detects a flicker phase, a period detection circuit 26b which detects a flicker period, and a level detection circuit 26c which detects a difference level.

The correction signal generation circuit 28 includes a correction table 41, a coefficient adjustment unit 42, multiplier 43 and 45, and a level adjustment unit 44. The correction table 41 can store correction data corresponding to one period of representative fluorescent flicker for each vertical line number.

The phase detection circuit 26a detects the flicker phase based on the difference signal SA. Further, the phase detection circuit 26a generates a reading start address TFs based on the flicker phase and outputs the reading start address TFs to the correction table 41.

The period detection circuit 26b detects the flicker period based on the difference signal SA. Further, the period detection circuit 26b determines whether a flicker frequency is 50 Hz or 60 Hz based on the flicker period, generates a reading period LinF based on the determination result, and outputs the reading period LinF to the correction table 41.

Coefficients KTB1 for each vertical line number in the correction table 41 are sequentially read from the reading start address TFs in accordance with the reading period LinF and are output to the multiplier 43.

The level detection circuit 26c calculates a coefficient GSA based on the difference signal SA and outputs the coefficient GSA to the coefficient adjustment unit 42. The coefficient adjustment unit 42 calculates a ratio between the initially set coefficient GSA and the flicker assumption level KGSA and outputs the ratio to the multiplier 43.

The multiplier 43 multiplies the coefficient KTB1 read from the correction table 41 by the calculation result of the coefficient adjustment unit 42 to generate a flicker correction coefficient KE' for each even-numbered line.

The level adjustment unit 44 calculates an amplification level based on the accumulation time ratio KT12 and the accumulation time Tint1 and outputs the amplification level to the multiplier 45. Further, the level adjustment unit 44 can make an adjustment such that the amplification level is lower when the accumulation time Tint1 is long and the amplification level to be higher when the accumulation time Tint1 is short.

The multiplier 45 multiplies the amplification level by the flicker correction coefficient KE' output from the multiplier 43 and generates the flicker correction coefficient KO' for each odd-numbered line.

Thus, the flicker can be suppressed in a moving image since the flicker level can be corrected based on the difference between the signals OUTP of the pixels of the lines in which the accumulation times are different.

Figure 4:
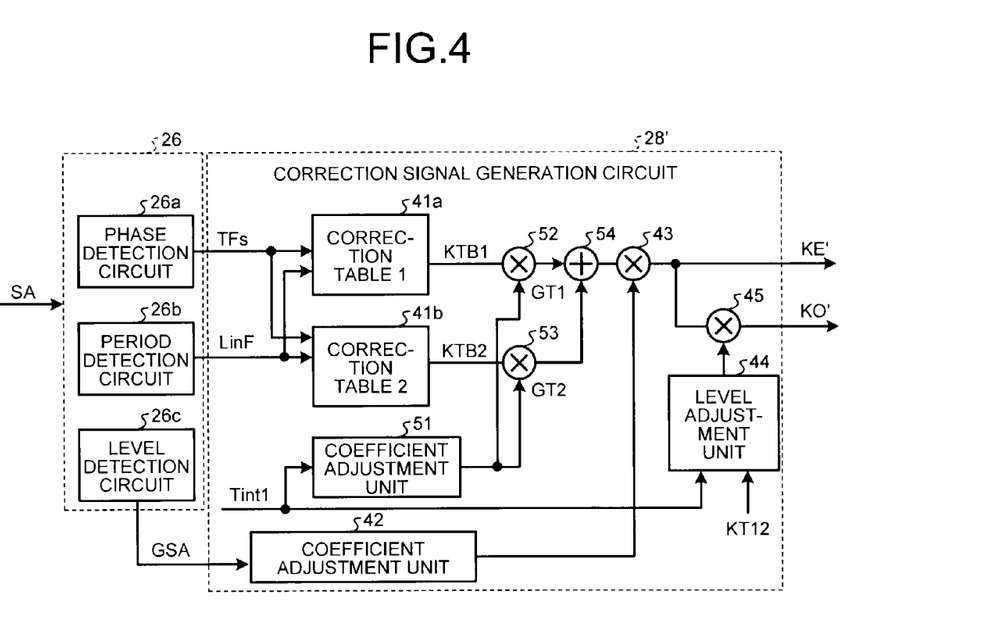
FIG. 4 is a block diagram of another example of the correction signal generation circuit in FIG. 2

FIG. 4 is a block diagram of another example of the correction signal generation circuit in FIG. 2.

In FIG. 4, a correction signal generation circuit 28' includes correction tables 41a and 41b instead of the correction table 41 of the correction signal generation circuit 28 and further includes a coefficient adjustment unit 51, multipliers 52 and 53, and an adder 54. Correction data of the fluorescent flicker stored in the correction tables 41a and 41b can be mutually changed in accordance with the accumulation time. For example, the correction table 41a may store correction data (for example, K1 in FIGS. 8A and 8B) of representative fluorescent flicker when the accumulation time is long. The correction table 41b may store correction data (for example, K3 in FIGS. 8A and 8B) of representative fluorescent flicker when the accumulation time is short.

The phase detection circuit 26a detects the flicker phase based on the difference signal SA. Further, the phase detection circuit 26a generates a reading start address TFs from the flicker phase and outputs the reading start address TFs to the correction tables 41a and 41b.

The period detection circuit 26b detects the flicker period based on the difference signal SA. Further, the period detection circuit 26b determines whether a flicker frequency is 50 Hz or 60 Hz based on the flicker period, generates a reading period LinF based on the determination result, and outputs the reading period LinF to the correction tables 41a and 41b.

Coefficients KTB1 and KTB2 for each vertical line number in the correction tables 41a and 41b are sequentially read from the reading start address TFs in accordance with the reading period LinF, respectively, and are output to the multipliers 52 and 53, respectively.

The coefficient adjustment unit 51 varies gain coefficients GT1 and GT2 in accordance with the accumulation time Tint1 and outputs the coefficients GT1 and GT2 to the multipliers 52 and 53, respectively. At this time, the gain coefficients GT1 and GT2 are adjusted to satisfy GT1+GT2=1. When the accumulation time is long, the gain coefficient GT1 is set to 1, and the gain coefficient GT2 is set to 0. Therefore, the flicker is corrected with only the coefficient KTB1 of the correction table 41a. When the accumulation time is short, the gain coefficient GT1 is set to 0 and the gain coefficient GT2 is set to 1. Therefore, the flicker is corrected with only the coefficient KTB2 of the correction table 41b. When the accumulation time is intermediate, for example, the gain coefficient GT1 is set to be equal to 0.5 and the gain coefficient GT2 is set to be equal to 0.5. Therefore, the flicker is corrected with both the coefficient KTB1 of the correction table 41a and the coefficient KTB2 of the correction table 41b.

That is, the multipliers 52 and 53 multiply the coefficients KTB1 and KTB2 of the correction tables 41a and 41b by the gain coefficients GT1 and GT2, respectively. The adder 54 adds the multiplied results and outputs the result to the multiplier 43.

Here, when the accumulation time is short in the dark region of a flicker signal, the width of a flicker waveform is narrowed. Therefore, it is necessary to increase the gain. On the other hand, when the accumulation time is long, the width of the flicker waveform is enlarged, and thus the gain may be small. Thus, a flicker correction precision can be further improved by varying the flicker correction coefficients KE' and KO' of the dark region of the flicker waveform in accordance with the accumulation time.

Figure 5:
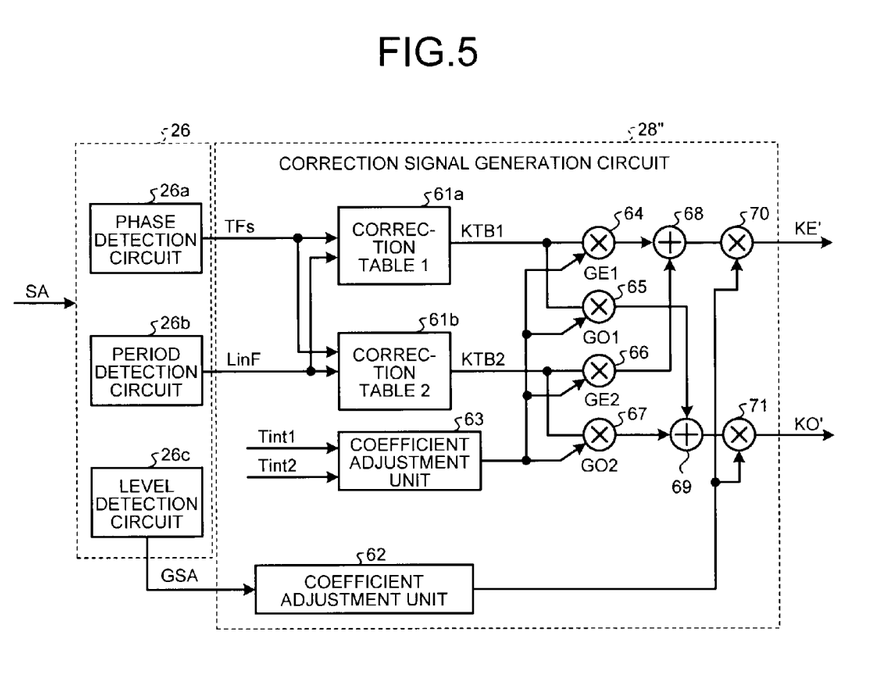
FIG. 5 is a block diagram of still another example of the correction signal generation circuit in FIG. 2.

FIG. 5 is a block diagram of still another example of the correction signal generation circuit in FIG. 2.

In FIG. 5, a correction signal generation circuit 28" includes correction tables 61a and 61b, coefficient adjustment units 62 and 63, multipliers 64 to 67, 70, and 71, and adders 68 and 69. Correction tables 61a and 61b can store the same correction data as those of the correction tables 41a and 41b in FIG. 4.

The phase detection circuit 26a detects the flicker phase based on the difference signal SA. Further, the phase detection circuit 26a generates a reading start address TFs based on the flicker phase and outputs the reading start address TFs to the correction tables 61a and 61b.

The period detection circuit 26b detects the flicker period based on the difference signal SA. Further, the period detection circuit 26b determines whether a flicker frequency is 50 Hz or 60 Hz f based on rom the flicker period, generates a reading period LinF based on the determination result, and outputs the reading period LinF to the correction tables 61a and 61b.

Coefficients KTB1 and KTB2 for each vertical line in the correction tables 61a and 61b are sequentially read from the reading start address TFs in accordance with the reading period LinF. The coefficient KTB1 is output to the multipliers 64 and 65 and the coefficient KTB2 is output to the multipliers 66 and 67.

The coefficient adjustment unit 63 varies gain coefficient GE1 and GE2 in accordance with the accumulation time Tint1 and outputs the gain coefficients GE1 and GE2 to the multipliers 64 and 66, respectively. Further, the coefficient adjustment unit 63 varies gain coefficients GO1 and GO2 in accordance with the accumulation time Tint2 and outputs the gain coefficients GO1 and GO2 to the multipliers 65 and 67, respectively.

At this time, the gain coefficients GE1 and GE2 are adjusted to satisfy GE1+GE2=1. Further, the gain coefficients GO1 and GO2 are adjusted to satisfy GO1+GO2=1. When the accumulation time is long, the gain coefficients GE1 and GO1 are set to 1, and the gain coefficients GE2 and GO2 are set to 0. Therefore, the flicker is corrected with only the coefficient KTB1 of the correction table 61a. When the accumulation time is short, the gain coefficients GE1 and GO1 are set to 0, and the gain coefficients GE2 and GO2 are set to 1. Therefore, the flicker is corrected with only the coefficient KTB2 of the correction table 61b. When the accumulation time is intermediate, for example, the gain coefficients GE1 and GO1 are set to be equal to 0.5 and the gain coefficients GE2 and GO2 are set to be equal to 0.5. Therefore, the flicker is corrected with both the coefficient KTB1 of the correction table 61a and the coefficient KTB2 of the correction table 61b.

That is, the multipliers 64 and 66 multiply the coefficients KTB1 and KTB2 of the correction tables 61a and 61b by the gain coefficients GE1 and GE2, respectively. The adder 68 adds the multiplied results and outputs the result to the multiplier 70.

Further, the multipliers 65 and 67 multiply the coefficients KTB1 and KTB2 of the correction tables 61a and 61b by the gain coefficients GO1 and GO2, respectively. The adder 69 adds the multiplied results and outputs the result to the multiplier 71.

The level detection circuit 26c calculates a coefficient GSA based on the difference signal SA and outputs the coefficient GSA to the coefficient adjustment unit 62. The coefficient adjustment unit 62 calculates a ratio between the coefficient GSA and the flicker assumption level KGSA and outputs the ratio to the multipliers 70 and 71.

The multiplier 70 multiplies the added result of the multiplier 68 by the calculation result of the coefficient adjustment unit 62 to generate a flicker correction coefficient KE' for each even-numbered line. Further, the multiplier 71 multiplies the added result of the adder 69 by the calculation result of the coefficient adjustment unit 62 to generate a flicker correction coefficient KO' for each odd-numbered line.

Thus, the flicker correction precision can be further improved since the optimum flicker correction coefficients KE' and KO' for the accumulation times Tint1 and Tint2 are generated.

Figure 6:
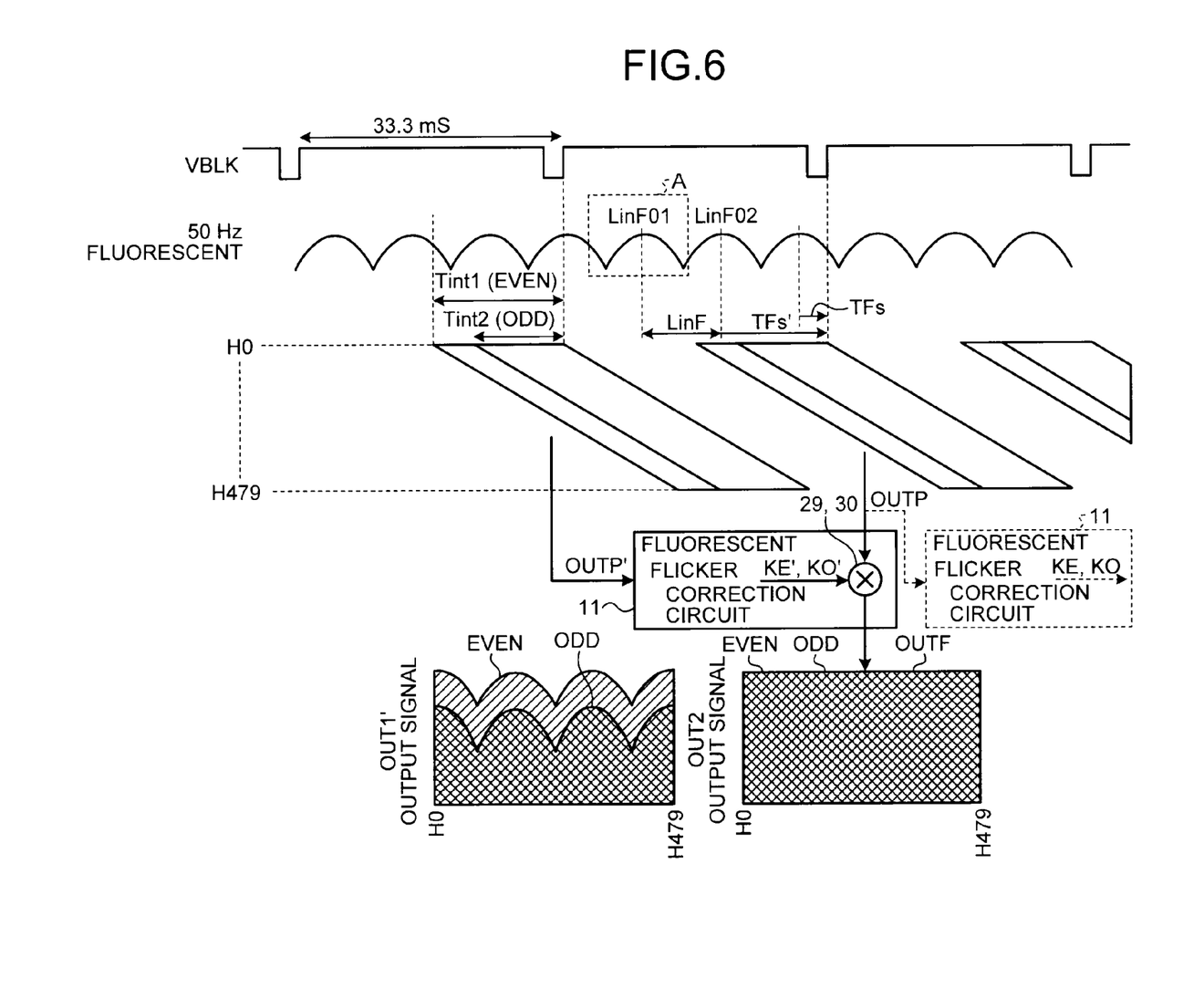
FIG. 6 is a timing chart of a flicker correction method of the solid-state imaging apparatus in FIG. 1.

FIG. 6 is a timing chart of a flicker correction method of the solid-state imaging apparatus in FIG. 1.

In FIG. 6, the fluorescent flicker is generated in both the output signal ODD of the even-numbered line and the output signal EVEN of the even-numbered line under a fluorescent. Here, the accumulation time of the even-numbered line within the current one frame is set to Tint1 and the accumulation time of the odd-numbered line within the current one frame is set to Tint2. The generation amount of flicker is made to be different between the output signal ODD of the odd-numbered line and the output signal EVEN of the even-numbered line among the output signals OUTP' of one frame. For example, the accumulation time Tint2 of the odd-numbered line may be set to Tint2=Tint1*⅘. At this time, ¼ (which can be obtained by shifting a digital signal by 2 bits) of a signal amount of the odd-numbered line can be added to the accumulation time to obtain the same signal amount as that of the even-numbered line. This calculation is ⅘ *¼+ ⅘=5/5=1. Therefore, this calculation can be processed not by multiplication for a large-scale circuit but by addition for a small-scale circuit.

Thus, from the flicker correction circuit 11, it is possible to obtain the correction signal OUTF obtained by correcting the flicker of the output signal ODD of the odd-numbered line and the output signal EVEN of the even-numbered line in the output signal OUTP of the subsequent one frame. At this time, when a color sensor array is the Bayer array, only the signal G is extracted and addition average of the plurality of lines in the horizontal direction may be performed.

The flicker correction coefficients KE' and KO' for obtaining the correction signal OUTF can be calculated by detecting flicker information based on the signals of the current frame. At this time, when the signals of the subsequent frame are output, the flicker correction circuit 11 can output the correction signal OUTF and can detect the flicker phase, the flicker period, and the flicker level in order to generate the correction coefficients KE and KO of the next but one frame.

Since the fluorescent flicker is not changed in a use place, once determined data can be used in the detection of the flicker period, and thus the detection process in every frame may not be repeated.

Figure 7:
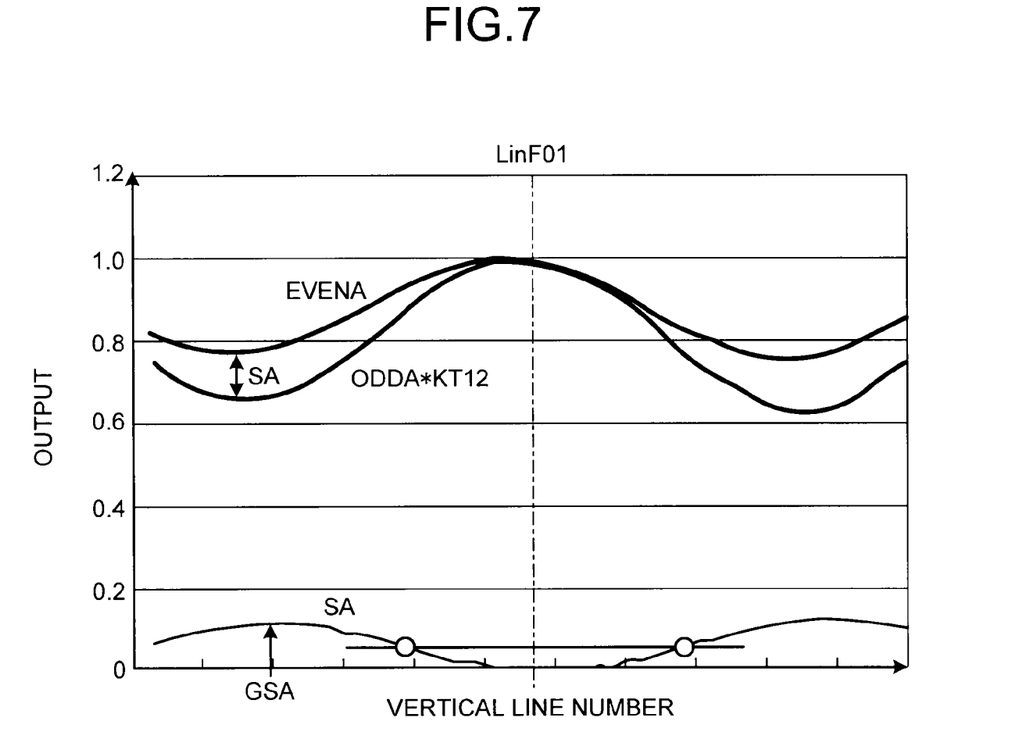
FIG. 7 is a diagram of signal waveforms of respective units of a light information detection circuit in FIG. 2.

FIG. 7 is a diagram of signal waveforms of respective units of the light information detection circuit in FIG. 2. In FIG. 7, a part (part A in FIG. 6) of the vertical signal is extracted. A value obtained by multiplying the accumulation time ratio KT12 by the average value ODDA is shown for the average value ODDA of the odd-numbered line.

In FIG. 7, the average values EVENA of the even-numbered lines and the values which are obtained by multiplying the average values ODDA of the odd-numbered lines by the accumulation time ratio KT12 have substantially the same level in the light region of the flicker signal. The average values EVENA of the even-numbered lines and the values which are obtained by multiplying the average values ODDA of the odd-numbered lines by the accumulation time ratio KT12 are different from each other in the dark region of the flicker signal, and thus the difference signal SA is generated. A vertical line number LinF01 is calculated in which the difference signal SA becomes a zero level and the flicker correction coefficient is one time. Further, the position of the vertical line number LinF01 may be calculated for high precision by calculating the average value of the vertical line numbers of two positions (white circles in FIG. 7) where the difference signal SA has a predetermined level.

A vertical line number LinF02 in FIG. 6 is calculated in the same manner and a flicker period LinF can be calculated from the difference between the vertical line numbers LinF01 and LinF02. From the flicker period LinF, it can be determined whether the period of the fluorescent flicker is 50 Hz or 60 Hz. Further, since the phase of the fluorescent flicker of the subsequent frame can be determined by calculating the number of lines from the vertical line number LinF02 to the subsequent frame, the reading start address TFs of the flicker correction coefficient can be obtained.

At a window where outside light enters, the fluorescent flicker level decreases. In an indoor place where outside light does not enter, the fluorescent flicker level increases. Accordingly, it is necessary to control the correction level of the fluorescent flicker. Since the intensity of the flicker being generated can be detected by setting the highest level of the difference signal SA to the coefficient GSA, the correction can be performed in accordance to the intensity of the flicker.

Figure 8A:
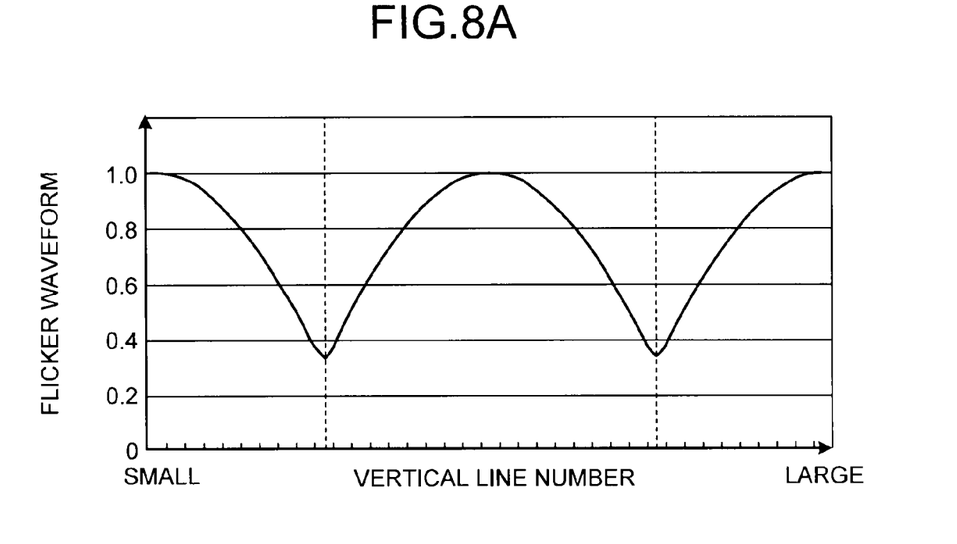
FIG. 8A is a diagram of a flicker waveform and FIG. 8B is a diagram of a flicker correction coefficient corresponding to the flicker waveform in FIG. 8A.
Figure 8B:
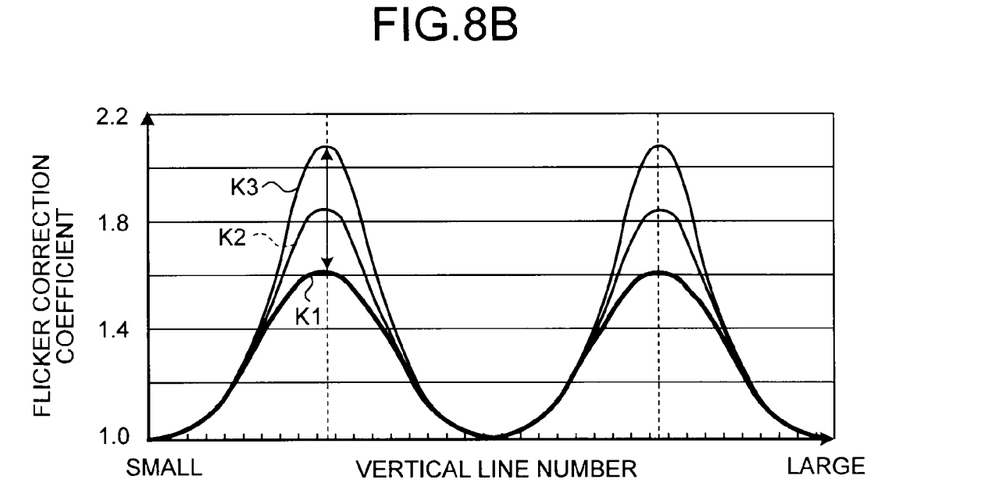

FIG. 8A is a diagram of a flicker waveform and FIG. 8B is a diagram of the flicker correction coefficient corresponding to the flicker waveform in FIG. 8A. The flicker waveform in FIG. 8A indicates a signal waveform when the accumulation time of the pixels is made to be short.

FIG. 8A, a fluorescent emits light with the intensity similar to the signal waveform when the accumulation time of the pixels is made to be short. Here, the high intensity and the low intensity of the fluorescent flicker level are repeated at a constant period (50 Hz or 60 Hz). At this time, the slope of a variation in the flicker level is large in the dark region of the flicker, whereas the slope of the variation in the flicker level is small in the light region of the flicker.

For this reason, when the accumulation time of the pixels is varied, the difference in the flicker level increases in the dark region of the flicker and the difference in the flicker level decreases in the light region of the flicker.

As shown in FIG. 8B, in the dark region of the flicker, the shorter the accumulation time is, the larger the flicker correction coefficient is (K1→K2→K3). In the light region of the flicker, the flicker correction coefficient has substantially the same value irrespective of whether the accumulation time is long or short.

Figure 9:
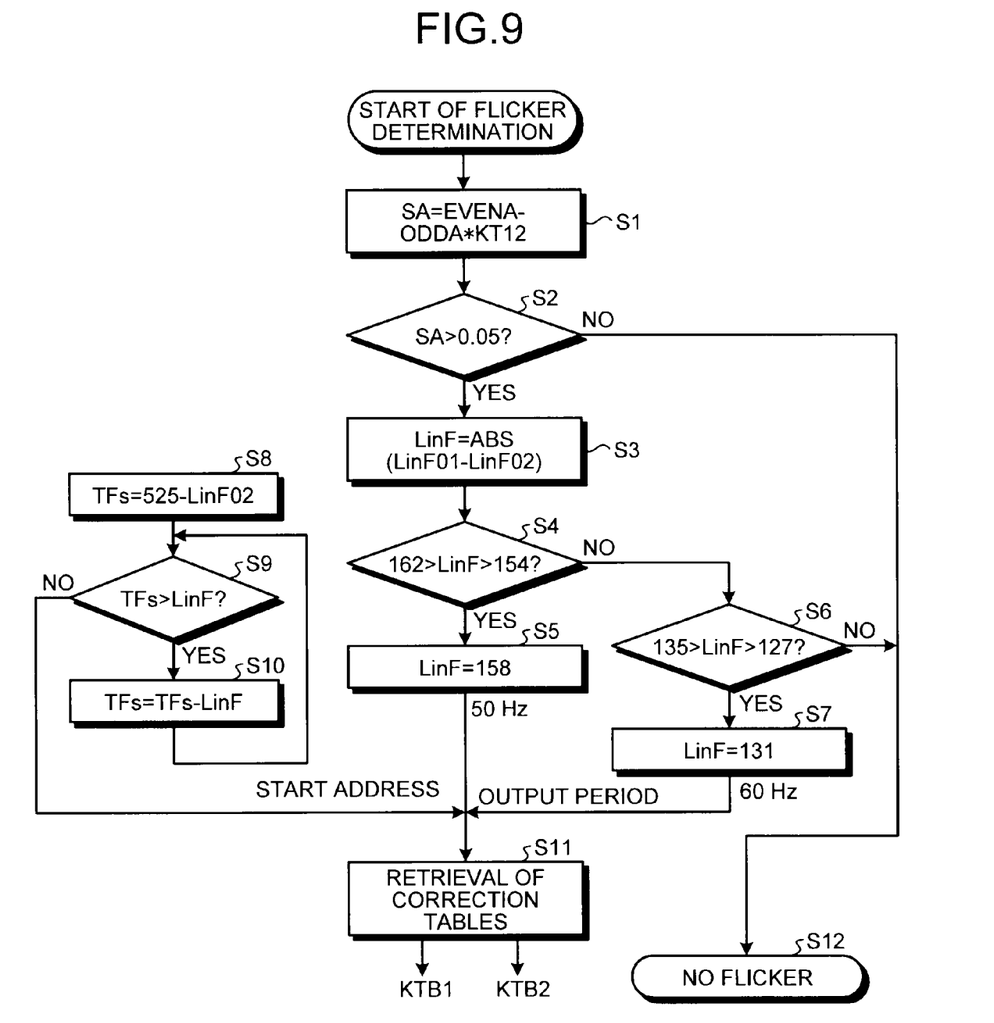
FIG. 9 is a flowchart of a correction table retrieving method in the correction signal generation circuit in FIG. 4.

FIG. 9 is a flowchart of a correction table retrieving method in the correction signal generation circuit in FIG. 4.

As shown in FIG. 9, in step S1, the light information detection circuit 12 in FIG. 2 calculates the difference signal SA between the average value EVENA of the even-numbered line and the value obtained by multiplying the accumulation time ratio KT12 by the average value ODDA of the odd-numbered line. When the difference signal SA is less than a predetermined level (for example, 0.05) in step S2, it is determined in step S12 that no flicker is generated. When no flicker is generated, the accumulation times Tint1 and Tint2 are made to be the same as each other. Alternatively, the signal ODD of the odd-numbered line is set to a signal amplified at the accumulation time ratio KT12.

On the other hand, when it is determined that the difference signal SA is greater than the predetermined level (for example, 0.05), the flicker period LinF is calculated in step S3. At this time, the flicker period LinF can be the difference between the vertical line numbers LinF01 and LinF02 in which the signal level of the difference signal SA is determined to be zero.

When the flicker period LinF is less than the line number 162 and is greater than the line number 154 in step S4, it is determined that the fluorescent flicker of 50 Hz is generated and the reading period LinF is set to 158 in step S5. When the determination result of step S4 is NO and the flicker period LinF is less than the line number 135 and is greater than the line number 127 in step S6, it is determined that the fluorescent flicker of 60 Hz is generated and the reading period LinF is set to 131 in step S7. When the determination result of step S6 is NO, it is determined that the flicker is generated as a peculiar phenomenon, and then the same operation as that of a case of no flicker correction is performed in step S12.

In step S11, it is controlled such that the coefficients KTB1 and KTB2 of the correction tables 41a and 41b in FIG. 4 are output in accordance with the reading period LinF of 158 or 131. For example, the correction tables 41a and 41b may store two correction data of 50 Hz and 60 Hz and the correction data may be changed over in accordance with the reading period LinF. Alternatively, the correction tables 41a and 41b may have only the correction data of 50 Hz and the correction data of 60 Hz may be generated by interpolation calculation using the correction data of 50 Hz. Alternatively, the correction tables 41a and 41b may have only the correction data of 60 Hz and the correction data of 50 Hz may be generated by interpolation calculation using the correction data of 60 Hz.

The flicker phase is calculated by calculating the number of lines from the vertical line number LinF02 to the start of the subsequent frame and the reading start address TFs of the correction tables 41a and 41b is calculated. In a VGA operation, the number of lines of one frame is 525. Accordingly, in step S8, the reading start address TFs can be calculated by subtracting the vertical line number LinF02 from 525. When the reading start address TFs is greater than the flicker period LinF in step S9, calculation of TFs=TFs=LinF is reiterated in step S10.

In the signal correction of the subsequent frame, the flicker is corrected by reading the coefficients KTB1 and KTB2 from the position of the line number of the reading start address TFs. When the coefficients KTB1 and KTB2 are read from the correction tables 41a and 41b by the reading period LinF, respectively, the process is returned to the first of the correction tables 41a and 41b to read the coefficients KTB1 and KTB2. The operation is continuously reiterated during one frame in such a way of reading the coefficients KTB1 and KTB2 from the correction tables 41a and 41b by the reading period LinF. When the coefficients KTB1 and KTB2 are read from the correction tables 41a and 41b in the correction signal generation circuit 28' in FIG. 4, the flicker correction coefficients KE' and KO' are calculated from the coefficients KTB1 and KTB2, respectively.

Figure 10:
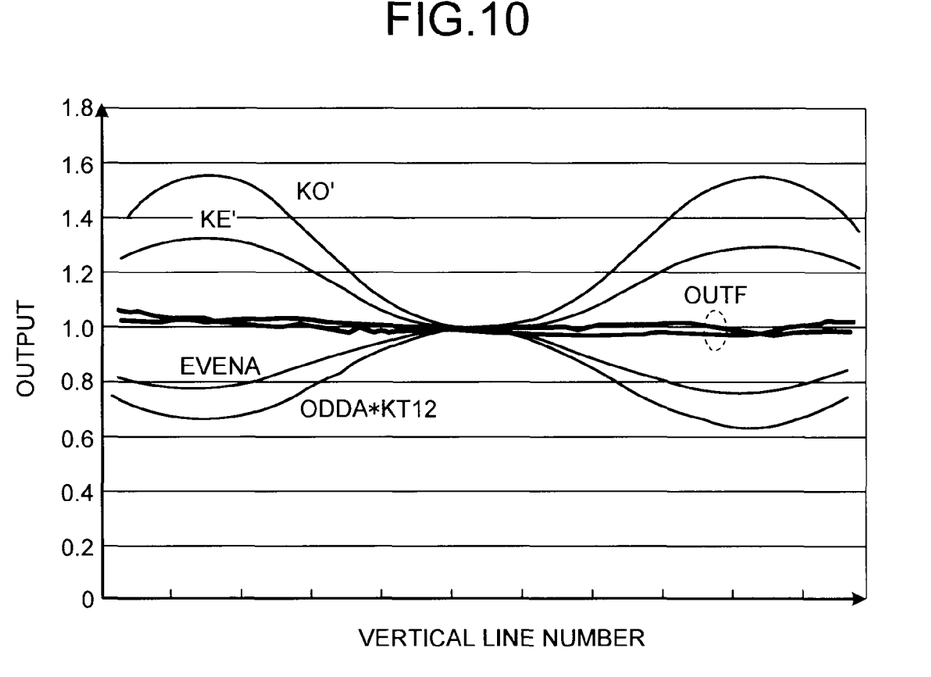
FIG. 10 is a diagram of signal waveforms of respective units of the light information detection circuit and the level correction circuit in FIG. 2.

FIG. 10 is a diagram of signal waveforms of respective units of the light information detection circuit and the level correction circuit in FIG. 2.

In FIG. 10, the difference signal SA is generated from the signals not subjected to the correction in FIG. 7 and the flicker correction coefficients KE' and KO' are calculated from the difference signal SA. The signals not subjected to the correction in FIG. 7 are corrected from the flicker correction coefficients KE' and KO' to generate the correction signal OUTF in which the flicker is corrected.

According to the above-described embodiment, the flicker can be corrected at both 50 Hz and 60 Hz in a moving image. Further, the accumulation times Tint1 and Tint2 can be set to be the same as each other when the long accumulation operation for which correction is not necessary is performed or when the accumulation time is 10 mS, 20 mS, 30 mS (commercial frequency of 50 Hz).

According to the above-described embodiment, the configuration has been exemplified in which one cell includes one pixel which is configured with one photodiode and four transistors. However, one cell may include two pixels or one cell may include four pixels. Further, the row selection transistor Ta may not be provided. Furthermore, the invention is applicable not only the CMOS solid-state imaging apparatus but also a MOS solid-state imaging apparatus of an XY address scanning type.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging apparatus comprising:
a pixel unit in which pixels are arranged in a matrix form;
an electronic shutter scanning circuit that can control an accumulation time of the pixels for each of adjacent lines of the pixel unit;
a flicker correction circuit that corrects flicker generated in a signal imaged in the pixel unit for each line, based on a signal of the pixels of each of the lines in which the accumulation times are different from each other,
wherein the flicker correction circuit includes:
a light information detection circuit that detects light quantity change information from the signals of the pixels of the different lines; and
a level correction circuit that corrects the signal of the pixels for each line, based on the light quantity change information detected by the light information detection circuit;
wherein the light information detection circuit includes:
a difference signal generation circuit that generates a difference signal between the signals of the pixels of the lines in which the accumulation times are different from each other;
a phase detection circuit that detects a phase of the light quantity change information, based on the difference signal;
a level detection circuit that detects a level of the light quantity change information, based on the difference signal; and
a period determination circuit that determines whether a period of the light quantity change information is 50 Hz or 60 Hz, based on the difference signal,
wherein the period determination circuit sets, as a flicker period, a difference between different vertical line numbers in which a signal level of the difference signal is determined to be zero.

2. The solid-state imaging apparatus according to claim 1, wherein the period determination circuit determines that fluorescence flicker of 50 Hz is generated when the flicker period is the same as the number of lines of the fluorescence flicker of 50 Hz, whereas determining that fluorescence flicker of 60 Hz is generated when the flicker period is the same as the number of lines of the fluorescence flicker of 60 Hz.

3. The solid-state imaging apparatus according to claim 1, wherein the flicker correction circuit corrects flicker generated in a signal of a subsequent frame imagined in the pixel unit, for each line, based on a signal of the pixels of each of the lines of a current frame in which the accumulation times are different from each other.

4. The solid-state imaging apparatus according to claim 1, wherein the electronic shutter scanning circuit includes two electronic shutter scanning circuits separately controlling the accumulation times of the pixels.

5. The solid-state imaging apparatus according to claim 4, wherein the electronic shutter scanning circuit separately controls the accumulation times of the pixels for odd-numbered lines and even-numbered lines.

6. The solid-state imaging apparatus according to claim 1, wherein the electronic shutter scanning circuit separately controls a first set of lines and a second set of lines by setting two vertical lines of the pixel unit as one set of lines.

7. The solid-state imaging apparatus according to claim 1, further comprising:
a signal processing circuit controlling the accumulation time of the pixels for each frame, based on a light quantity measurement value measured from the signal of the pixel units.

8. The solid-state imaging apparatus according to claim 1, wherein the pixel includes:
a photodiode performing photoelectric conversion,
a floating diffusion retaining charges accumulating in the photodiode;
a row selection transistor performing row selection based on a row selection signal;
a reset transistor resetting the floating diffusion based on a reset signal;
a reading transistor reading a signal from the photodiode and loading the signal which is read onto the floating diffusion based on a reading signal; and
an amplification transistor amplifying the signal read from the photodiode and loaded onto the floating diffusion.

9. A solid-state imaging apparatus comprising:
a pixel unit in which pixels are arranged in a matrix form;
an electronic shutter scanning circuit that can control an accumulation time of the pixels for each of adjacent lines of the pixel unit;
a flicker correction circuit that corrects flicker generated in a signal imaged in the pixel unit for each line, based on a signal of the pixels of each of the lines in which the accumulation times are different from each other, wherein the flicker correction circuit includes:
- a light information detection circuit that detects light quantity change information from the signals of the pixels of the different lines; and
- a level correction circuit that corrects the signal of the pixels for each line, based on the light quantity change information detected by the light information detection circuit;

wherein the light information detection circuit includes:
- a difference signal generation circuit that generates a difference signal between the signals of the pixels of the lines in which the accumulation times are different from each other;
- a phase detection circuit that detects a phase of the light quantity change information, based on the difference signal; and
- a level detection circuit that detects a level of the light quantity change information, based on the difference signal,
- wherein the difference signal generation circuit generates the difference signal based on a signal obtained by averaging signals of the pixels of the plurality of lines in which the accumulation times are the same as each other.

10. The solid-state imaging apparatus according to claim 9, wherein when a color filter array formed in the pixel unit is a Bayer array, the difference signal generation circuit extracts only a G signal from signals of the pixels of the lines in which the accumulation times are different from each other and generates the difference signal based on the extracted G signal.

11. The solid-state imaging apparatus according to claim 9, wherein the flicker correction circuit corrects flicker generated in a signal of a subsequent frame imagined in the pixel unit, for each line, based on a signal of the pixels of each of the lines of a current frame in which the accumulation times are different from each other.

12. The solid-state imaging apparatus according to claim 9, wherein the electronic shutter scanning circuit includes two electronic shutter scanning circuits separately controlling the accumulation times of the pixels.

13. The solid-state imaging apparatus according to claim 12, wherein the electronic shutter scanning circuit separately controls the accumulation times of the pixels for odd-numbered lines and even-numbered lines.

14. The solid-state imaging apparatus according to claim 9, wherein the electronic shutter scanning circuit separately controls a first set of lines and a second set of lines by setting two vertical lines of the pixel unit as one set of lines.

15. The solid-state imaging apparatus according to claim 9, further comprising:
- a signal processing circuit controlling the accumulation time of the pixels for each frame, based on a light quantity measurement value measured from the signal of the pixel units.

16. The solid-state imaging apparatus according to claim 9, wherein the pixel includes:
- a photodiode performing photoelectric conversion,
- a floating diffusion retaining charges accumulating in the photodiode;
- a row selection transistor performing row selection based on a row selection signal;
- a reset transistor resetting the floating diffusion based on a reset signal;
- a reading transistor reading a signal from the photodiode and loading the signal which is read onto the floating diffusion based on a reading signal; and
- an amplification transistor amplifying the signal read from the photodiode and loaded onto the floating diffusion.

17. A solid-state imaging apparatus comprising:
- a pixel unit in which pixels are arranged in a matrix form;
- an electronic shutter scanning circuit that can control an accumulation time of the pixels for each of adjacent lines of the pixel unit;
- a flicker correction circuit that corrects flicker generated in a signal imaged in the pixel unit for each line, based on a signal of the pixels of each of the lines in which the accumulation times are different from each other,
- wherein the flicker correction circuit includes:
  - a light information detection circuit that detects light quantity change information from the signals of the pixels of the different lines; and
  - a level correction circuit that corrects the signal of the pixels for each line, based on the light quantity change information detected by the light information detection circuit;
  - wherein the level correction circuit includes a correction signal generation circuit correcting the flicker generated in the signal imaged in the pixel unit for each line based on a correction coefficient stored in a correction table,
  - wherein the correction table stores a one-period correction coefficient of representative fluorescence flicker for each vertical line number.

18. The solid-state imaging apparatus according to claim 17, wherein the flicker correction circuit calculates flicker phase by calculating the number of lines in a range from the vertical line number, in which a signal level of the difference signal is determined to be zero, to start of a subsequent frame, and calculates a reading start address of the correction table.

19. The solid-state imaging apparatus according to claim 18, wherein the flicker correction circuit continuously repeats an operation of reading the correction coefficient from the correction table by a flicker period, from a position of a line number of the reading start address during one frame.

20. The solid-state imaging apparatus according to claim 19, wherein the flicker correction circuit sets, as the flicker period, a difference between the different vertical line numbers in which the signal level of the difference signal is determined to be zero.

* * * * *